United States Patent [19]

Mache

[11] Patent Number: 6,006,491

[45] Date of Patent: Dec. 28, 1999

[54] EQUIPMENT RECEIVING CONTINUOUSLY AND INDIVIDUALLY DELIVERED OBJECTS AND ARRANGING THESE OBJECTS IN SETS

[76] Inventor: Siegfried Mache, Bürgermeister-Gebhardt-Str. 16, D-74564 Crailsheim, Germany

[21] Appl. No.: 08/646,982

[22] Filed: May 8, 1996

[30] Foreign Application Priority Data

May 8, 1995 [DE] Germany .............................. 195 16 807

[51] Int. Cl.⁶ ........................................................ B65B 35/32
[52] U.S. Cl. ................................ 53/147; 53/154; 53/168; 53/247; 53/531; 198/368; 198/575
[58] Field of Search ............................... 53/147, 154, 168, 53/247, 443, 448, 531, 537, 542, 543; 198/347.4, 368, 431, 436, 437, 575, 577, 601

[56] References Cited

U.S. PATENT DOCUMENTS

| | | |
|---|---|---|
| 2,601,376 | 6/1952 | Eaton . |
| 3,204,752 | 9/1965 | Conner .................................. 53/543 X |
| 3,297,129 | 1/1967 | Lesch .................................. 198/437 X |
| 3,593,837 | 7/1971 | Loomis ................................. 53/537 X |
| 3,794,154 | 2/1974 | Holt ..................................... 53/543 X |
| 3,954,165 | 5/1976 | Snyder .................................. 53/152 X |
| 4,344,523 | 8/1982 | May et al. ............................ 53/543 X |
| 4,610,346 | 9/1986 | Phillipson ........................... 198/368 X |
| 4,621,725 | 11/1986 | Rutter .................................. 198/436 X |
| 4,874,079 | 10/1989 | Frenkel et al. ........................... 198/436 |
| 4,934,129 | 6/1990 | Hoffman et al. .......................... 53/443 |
| 5,018,334 | 5/1991 | Guttinger et al. .................... 53/542 X |

FOREIGN PATENT DOCUMENTS

| | | |
|---|---|---|
| 1025783 | 3/1958 | Germany . |
| 1 248 534 | 3/1968 | Germany . |
| 1248534 | 3/1968 | Germany . |
| 18 12 293 | 6/1970 | Germany . |
| 90 339 | 6/1972 | Germany . |
| 90339 | 6/1972 | Germany . |
| 2701464 | 7/1977 | Germany . |
| 2336000 | 8/1982 | Germany . |
| 3724839 | 7/1991 | Germany . |

OTHER PUBLICATIONS

Patent Abstracts of Japan No. M–1005, 2–127224, Aug. 2, 1990, vol. 14/No.357.

*Primary Examiner*—Daniel Moon
*Attorney, Agent, or Firm*—Lowe, Price, LeBlanc & Becker

[57] ABSTRACT

The invention concerns equipment receiving continuously and individually delivered objects and arranging these objects into sets for discharge to a packaging station. Two conveyor chains (3, 4) fitted with compartments to receive the objects are mounted transversely to the objects' conveyor belt (2) so that these compartments shall be colinear in the direction of object delivery. A stop (7, 8) is mounted between the two conveyor chains (3, 4) in the extension of the objects' direction of delivery and is designed to open and close the compartment of the conveyor chain (4) located at the rear as seen in the direction of object delivery. A control system controls the stop (7, 8) as well as the drives of the conveyor chains (3, 4) in such manner that at a given time one of the conveyor chains (3, 4) shall be running and receiving the incoming objects while the other conveyor chain (4, 3) shall be stationary and so that following a predetermined number of timing signals the running conveyor chain (3, 4) shall be stopped and the particular other conveyor chain (4, 3) shall be made to run, the stop (7, 8) being switched in such a way that thereupon the other conveyor chain made to run will then receive the incoming objects. In this manner continuous operation without interruptions by long shutdown times to remove objects from the particular stopped conveyor chain is made possible.

5 Claims, 4 Drawing Sheets

EQUIPMENT RECEIVING CONTINUOUSLY AND INDIVIDUALLY DELIVERED OBJECTS AND ARRANGING THESE OBJECTS IN SETS

TECHNICAL FIELD

The present invention relates to equipment for receiving continuously and individually delivered objects and arranging these objects in sets for transfer to a packaging station or the like, and more particularly, to such equipment employing a closed conveyor chain mounted transversely to the conveyance path of the delivered objects, the chain being fitted with compartments receiving the objects.

BACKGROUND ART

Such equipment as mentioned above is known, for instance, from the German patent documents 37 24 839 C2, OS 27 01 464 and PS 23 36 000.

This equipment, also known as baffle chains, is mounted in a packaging plant between a the conveyance track for delivery of objects to be packaged and the packaging machine proper and is used to accept the continuously delivered individual objects and to store them temporarily in such manner that they can be removed in sets and transferred to the packaging machine proper where they are packaged in sets. For that purpose a baffle chain must be designed to continuously provide a corresponding receiving compartment on its receiving side to the incoming objects and at the same time the set of objects to be removed must be at last apparently stationary on the discharge side for a time interval adequate for such a discharge.

In principle this design is implemented in known equipment by mounting the conveyor chain resting in a horizontal plane on a carriage which is displaceable parallel to the direction of conveyance of the conveyor chain and which is driven synchronously with the conveyor chain. In this manner the receiving side of the conveyor chain continuously moves chain compartments past the receiving position for the objects to be received while the opposite chain side from which the objects are removed in sets is standing still.

Equipment based on the above principle however incurs the drawback that with increasing timing, i.e. operational switching rates which for instance are desired to be about 1,000 events a minute for chocolate bars, the standing time for removing the sets of objects will be extraordinarily short. Moreover the conveyor chain of the known equipment must be pulled each time, that is pulled back into the initial position at the latest at the end of the carriage path, and this procedure also is time consuming and will create problems at high operational switching rates. Another advantage regarding adequately gently handling the products are the centrifugal forces arising at high operational switching rates and speeds occurring in the 180° curve of the known baffle chains. In addition, the known equipment involves the disadvantageous displacement of high masses.

SUMMARY OF THE INVENTION

An object of the invention is to so design equipment of the initially cited kind that even at high operational switching rates on one hand the standing times shall be adequately long to remove the sets of objects and on the other hand the objects shall be processed with adequate gentleness.

Moreover the equipment of the invention shall be simple and hence economical.

In the equipment of the invention, instead of the two sides of a single horizontal conveyor chain being used to receive and to discharge the objects, two conveyor belts with the same or with the opposite directions of conveyance are mounted one next to the other, acceptance and discharge of the objects being possible in each case at the same side of the chains. This equipment is furthermore so designed that one of the conveyor chains will be running at a particular time and will receive the incoming objects, whereas the other conveyor chain will be standing still, and, as a result, the objects may be removed in sets from the standing chain. A switchable stop ensures that the conveyor chains shall be accessible in alternating manner, that is that they will receive objects and will make sets of objects available for discharge, that is being stationary. The two conveyor chains are arrayed with respect to each other in such manner that their compartments are aligned with respect to each other and to the direction of receiving, the objects can be received by the compartments of that conveyor chain which, as seen in the direction of delivery, is located behind the front conveyor chain once the objects have passed through the corresponding stationary compartment of the front conveyor chain.

The design of the invention is characterized by simplicity of construction because the carriages bearing the timed conveyor chains are absent and long standing times are possible because the conveyor chain discharging the objects is standing still all the time the other conveyor chain is receiving a corresponding number of objects, no time losses being incurred as are present in known equipment on account of repositioning the carriage relative to the conveyor chain.

Particular preferred embodiments and further variations of the equipment of the invention are discussed below.

DETAILED DESCRIPTION OF THE INVENTION

Figure 1:
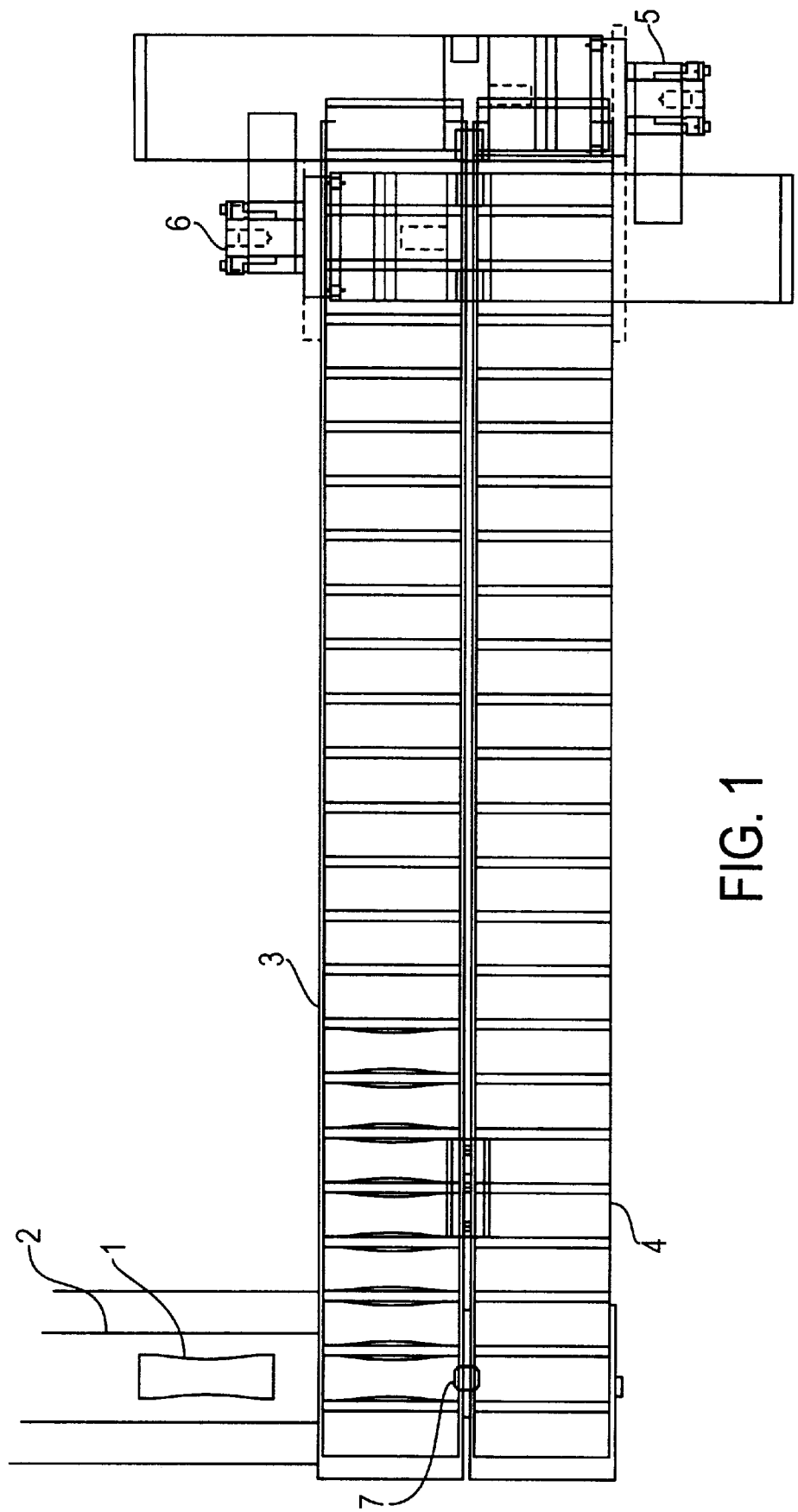
FIG. 1 is a top view of a first embodiment.

The equipment shown in FIG. 1 receives objects 1 continuously and individually delivered along a conveyor 2 and arranges these objects into sets for discharge to a packaging machine.

Figure 2:
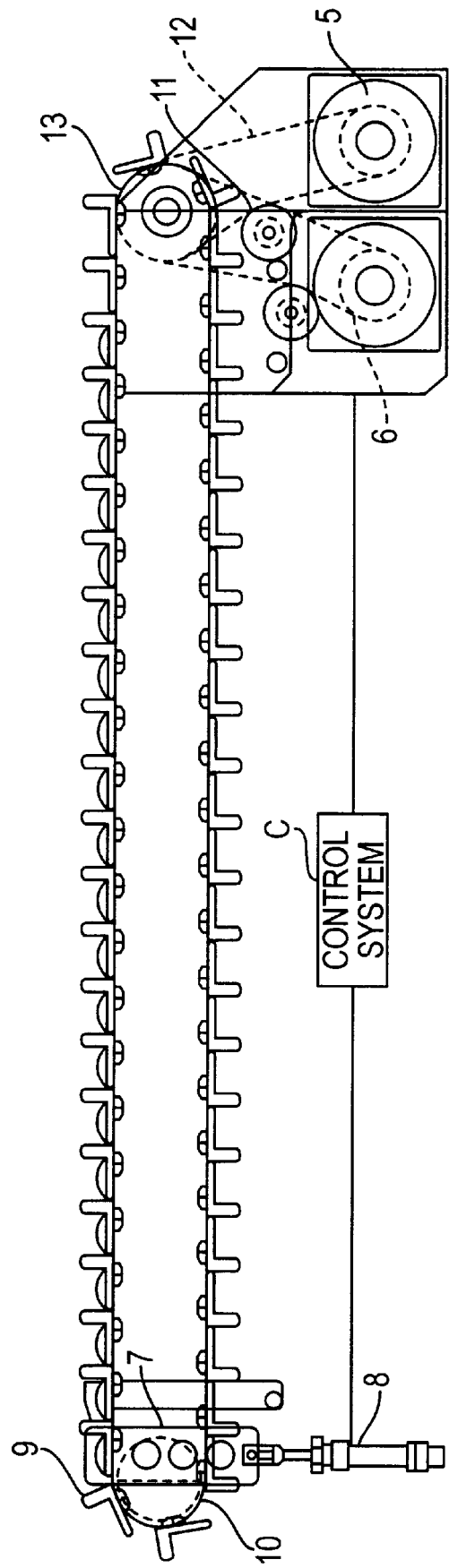
FIG. 2 is a side view of this embodiment.

Two closed conveyor chains 3, 4 are mounted in mutually parallel manner and with the same direction of conveyance and transversely to the conveyor belt 2 which extends approximately to the said equipment. The said chains 3, 4 comprise compartments to receive the incoming objects 1. The two runs of each of the conveyor chains 3, 4 run vertically one above the other, the two upper runs of both chains 3, 4 being located in one horizontal plane aligned with the plane of the conveyor belt 2. The compartments are shaped like drawers and, as in cross-section depicted in FIG. 2 may be composed of angled elements 9 of which the upright legs are forward on the as conveyor chain as seen in the direction of conveyance. The incoming objects 1 can be received in especially low-friction manner when the receiving compartment is located immediately behind one of the reversing wheels 10 of the conveyor chains 3, 4. As shown in FIG. 2, this design provides a wide open receiving drawer for the incoming object because the upright leg of the angled element 9 of the following compartment is radially spaced away from the reversing wheel 10 and therefore slants outward relative to the receiving compartment. However the compartments also may be in the form of U-shaped elements.

Separate drive motors 5, 6 drive the two conveyor chains 3, 4 and are connected through idler gears 11 and drive belts 12 to the driven shaft of the conveyor chains 3, 4 on which the other reversing wheel is borne.

The two conveyor chains 3, 4 are mutually arrayed in such a manner that their compartments are collinear direction (i.e., in the conveyor belt 2). A stop 7, 8 is present between the two conveyor chains 3, 4, i.e. extend namely in the extension of the delivery direction of the objects 1, and allows for opening and closing of the compartment of the rear conveyor chain 4 as seen in the direction of delivery of the objects 1.

Figure 3:
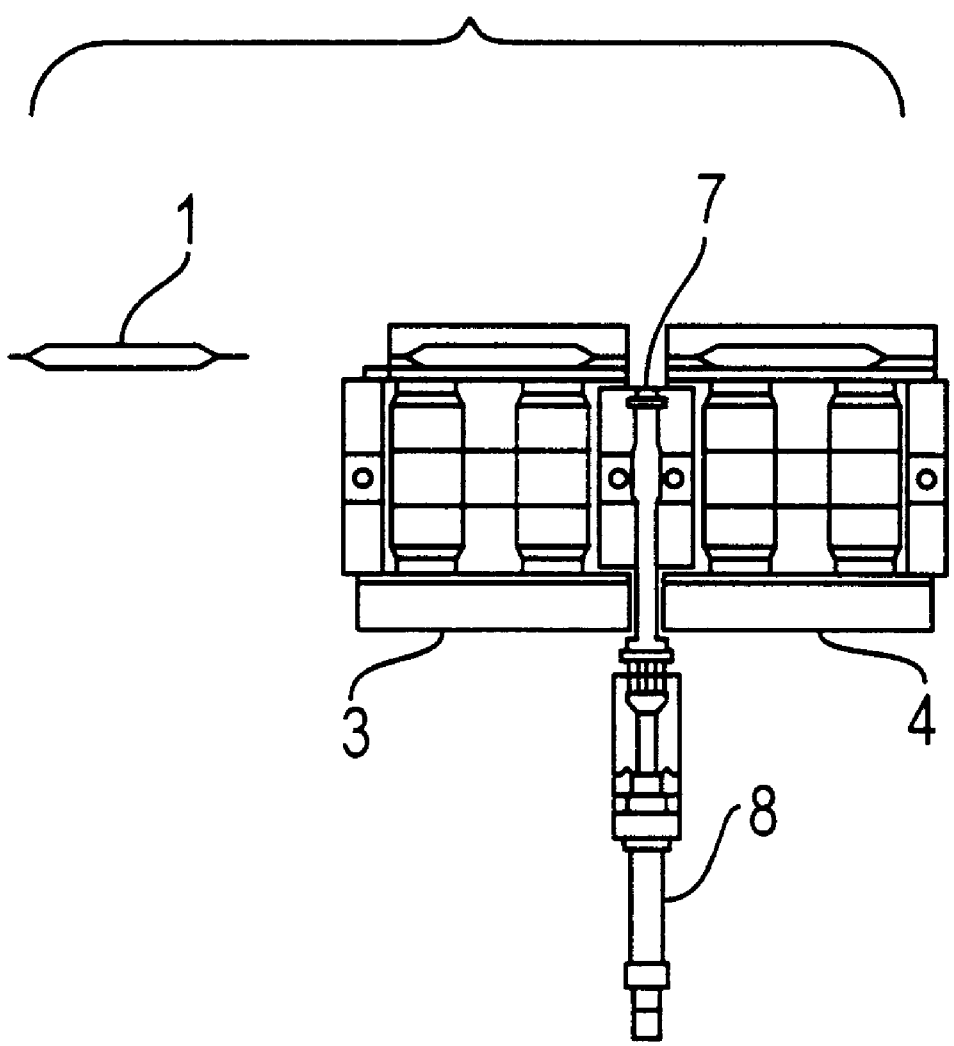
FIG. 3 is a front view of this embodiment.

The stop 7, 8 may be in the form of a slider, for instance a plate 7 as shown in FIGS. 2 and 3, illustratively being driven by a pneumatic or motor actuator 8. The actuator runs vertical to the delivery direction of the objects 1, and in the embodiment shown, this is the vertical direction.

The drives, that is in particular the motors 5 and 6 for the conveyor chains 3 and 4 and the actuators for the stop 7, 8 are connected to a control system (schematically depicted in FIG. 2 and identified with reference letter C). This control system c times one of the drive motors 5 and 6 of one of the conveyor chains 3 and 4 when the stop 7, 8 is in the pertinent position, the other conveyor chain then being stationary.

The above equipment operates as follows:

At a given time, illustratively the motor 6 of the conveyor chain 3 is timed by the control system c and as a result the compartments of the conveyor chain 3 run past the conveyor belt 2 for the objects 1 to be received and one object 1 will be received in each compartment. The stop, for instance the slider 7, then assumes a position for which the compartment to the rear of the conveyor chain 4 is closed. The conveyor chain 4 is free of timed actuation and remains stationary.

The individually incoming objects 1 are consecutively received in the compartments of the conveyor chain 3 and are moved on. After a specified number of timing actuations, i.e. switchings, the control system C terminates the timing of the motor 6 and thereby the conveyor chain 3 stops and the stop 7, 8 is driven in such a way that the path to the conveyor chain 4, which is to the rear as seen in the direction of delivery of the objects 1, is now clear, the motor 6 for this conveyor chain then being made operative. Consequently the conveyor chain 3 is stationary and a desired number of objects may be removed, for instance using a robot, and be transferred to a packaging machine where for instance they shall be packaged into a box, meantime the still continuously delivered objects 1 are received in the compartments of the conveyor chain 4 which now is running. For that purpose the objects 1 first move through forward, stationary compartment of the conveyor chain 3. After a number of timing signals, operation will be reversed, that is, the conveyor chain 4 is stopped and the conveyor chain 3 is made to run again, the stop 7, 8 being actuated in rigorously defined timing so that the path to the rear and (no longer running) conveyor chain 4 is blocked.

The sequence described above is cyclically repeated and thereby it is possible to receive the continuously incoming objects 1 and to alternatingly discharge them in sets from the two conveyor chains 3, 4.

The timing between the particular switching or controlling processes may be implemented using for instance photodetectors and light barriers sensing the incoming particular objects 1 and by means of their output signals to the control system c which then times the drive motors 5, 6 and switches the stop 7, 8. Related adaptations to the particulars of the delivery side of the objects 1 and to the discharge side may be implemented on site.

Figure 4:
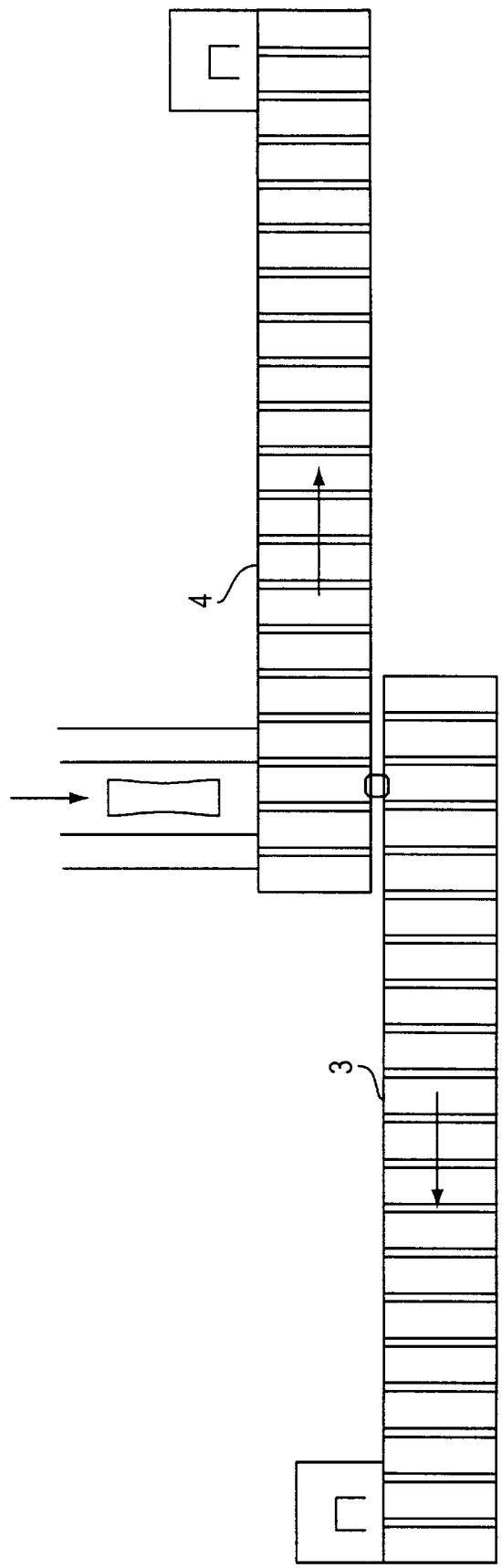
FIG. 4 is a top view of a second embodiment.

FIG. 4 shows a second embodiment which differs from the first of FIG. 1 in that the two conveyor chains 3, 4 run in opposite directions of conveyance and are mounted in offset manner as regards the receiving position for the objects 1. It is substantial in this design that the compartments of both conveyor chains 3, 4 be collinear and aligned with the direction of delivery of the objects 1.

I claim:

1. Equipment receiving continuously and individually delivered objects and arranging these objects in sets for discharge of these sets to a packaging station, comprising a first closed conveyor chain mounted transversely to an objects delivery conveyor belt and being fitted with compartments receiving the objects, and a second closed conveyor chain with compartments receiving the objects and being mounted downstream adjacent the first conveyor chain relative to the direction of conveyance of the delivery conveyor belt, said compartments of said second conveyor chain being collinear with corresponding compartments of the first conveyor chain relative to the direction of conveyance of the delivery belt, a stop mounted between the first and second conveyor chains in alignment with the delivery belt and being moveable to open and close access to a compartment of the second conveyor chain located in an infeed location of the second conveyor, and a control system operatively connected to drive one of the first and second conveyor chains while stopping the other of said first and second conveyor chains and being further operable in a controlled procedure to interrupt the drive of the driven one of said first and second conveyor chains following a predetermined number of conveyance timing signals, followed by actuating the stop and then driving the other of said first and second conveyors, and cyclically repeating said control procedure.

2. Equipment defined in claim 1, further comprising reversing wheels located at an infeed location of said first and second conveyors, said first and second conveyor chains being arrayed such that their first or infeed compartment is located adjacent one of the reversing wheels, said compartments being formed by cross-sectionally angled elements with erect legs at a front end thereof relative to the direction of conveyance of the first and Second conveyor chains.

3. Equipment defined in claim 1, wherein the stop is in the form of a slider of having a width that substantially corresponds to the length of the compartments.

4. Equipment defined in claim 3, wherein the slider is actuated in a direction perpendicular to the delivery conveyor belt.

5. Equipment defined in claim 4, wherein the actuation direction of the slider is in the vertical direction.

\* \* \* \* \*